United States Patent
Ohtaki et al.

(10) Patent No.: US 7,327,227 B2
(45) Date of Patent: Feb. 5, 2008

(54) VEHICLE SECURITY DEVICE AND ID CODE MANAGEMENT DEVICE

(75) Inventors: Kiyokazu Ohtaki, Aichi (JP); Toru Maeda, Aichi (JP); Hisashi Kato, Aichi (JP); Akiyoshi Osumi, Aichi (JP); Takeshi Kumazaki, Okazaki (JP); Ifushi Shimonomoto, Okazaki (JP); Toshio Shimomura, Chiryu (JP); Yoshinori Fukuoka, Toyota (JP); Koichi Masamura, Toyota (JP)

(73) Assignees: Kabushiki Kaisha Tokai Rika Denki Seisakusho, Aichi (JP); Denso Corporation, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 363 days.

(21) Appl. No.: 10/542,282

(22) PCT Filed: Nov. 4, 2004

(86) PCT No.: PCT/JP2004/016309

§ 371 (c)(1),
(2), (4) Date: Jul. 14, 2005

(87) PCT Pub. No.: WO2005/042317

PCT Pub. Date: May 12, 2005

(65) Prior Publication Data

US 2006/0152348 A1 Jul. 13, 2006

(30) Foreign Application Priority Data

Nov. 4, 2003 (JP) .............................. 2003-374654

(51) Int. Cl.
B60R 25/10 (2006.01)

(52) U.S. Cl. .............................. 340/426.1; 340/426.11; 340/426.13

(58) Field of Classification Search ............. 340/425.5, 340/426.1, 426.11, 426.13, 426.14, 426.16, 340/426.3, 426.35, 426.36, 5.62, 5.64, 5.73; 307/10.2, 10.4
See application file for complete search history.

(56) References Cited

U.S. PATENT DOCUMENTS 6,144,112 A * 11/2000 Gilmore .................... 307/10.2

(Continued)

FOREIGN PATENT DOCUMENTS

JP 08-086130 4/1996

(Continued)

Primary Examiner—Van T. Trieu
(74) Attorney, Agent, or Firm—Patterson, Thuente, Skaar & Christensen, P.A.

(57) ABSTRACT

A vehicle security device for improving the security level of a vehicle. The vehicle security device is connected to an engine and communicates with a portable device. A smart ECU performs a first coded communication to establish mutual authentication with the portable device. An ID code box is connected to the smart ECU, has a first code and a second code, and does not communicate with the portable device. The ID code box performs a second coded communication using the first code to establish a second mutual authentication with the smart ECU. An engine ECU performs a third coded communication using the second code to establish a third mutual authentication with the ID code box. The engine ECU enables the engine to be started when every one of the first, second, and third mutual authentications are established.

20 Claims, 3 Drawing Sheets

U.S. PATENT DOCUMENTS

| | | | |
|---|---|---|---|
| 6,188,140 B1 * | 2/2001 | Kito et al. | 307/10.4 |
| 6,359,547 B1 * | 3/2002 | Denison et al. | 340/5.73 |
| 6,977,576 B2 * | 12/2005 | Denison et al. | 340/5.73 |
| 7,019,615 B2 * | 3/2006 | Denison et al. | 340/5.73 |
| 7,187,266 B2 * | 3/2007 | Hasegawa et al. | 340/5.62 |

FOREIGN PATENT DOCUMENTS

| | | |
|---|---|---|
| JP | 10-157571 | 6/1998 |
| JP | 10-181533 | 7/1998 |
| JP | 2002-295085 | 10/2002 |
| JP | 2002-295098 | 10/2002 |

* cited by examiner

VEHICLE SECURITY DEVICE AND ID CODE MANAGEMENT DEVICE

TECHNICAL FIELD

The present invention relates to a security device, and more specifically, to a vehicle security device for enabling and disabling operation of a vehicle apparatus such as an engine, and an identification management device used by the vehicle security device.

BACKGROUND ART

Japanese Laid-Open Patent Publication No. 10-157571 discloses an example of an immobilizer system for preventing vehicle theft. This immobilizer system includes a code verification device, which is installed in the vehicle. The code verification device compares an identification code transmitted from an ignition key with an identification code set in the vehicle. The code verification device enables the starting of the engine when the two codes match and disables starting of the engine when the two codes do not match. An authentic key is provided with an identification code that matches the identification code of the vehicle, which makes it possible to start the engine. However, a third person who does not possess the authentic ignition key cannot drive the vehicle. Consequently, the immobilizer system prevents vehicle theft.

Japanese Laid-Open Patent Publication No. 2002-295089 discloses an example of an engine start enabling mechanism provided with a smart ignition function. The engine start enabling mechanism provided with a smart ignition function enables the engine to start when the user carries a portable device corresponding to the vehicle into the vehicle. This engine start enabling mechanism frees the user from burdensome operations such as inserting a mechanical key of a portable device into a key cylinder.

An engine start enabling mechanism 100 shown in FIG. 1 includes a portable device 101 and a communication controller 102, which is installed in the vehicle. The communication controller 102 is provided with a smart ignition electronic control unit (smart ECU) 103, an immobilizer electronic control unit (immobilizer ECU) 104, and an engine control electronic control unit (engine ECU) 105. When a user starts the engine, coded communications occur between the portable device 101 and the smart ECU 103, between the smart ECU 103 and the immobilizer ECU 104, and between the immobilizer ECU 104 and the engine ECU 105 to compare the identification codes. When the identification codes match in all of the coded communications, the engine ECU 105 enables the engine to start. Therefore, a high level of vehicle security is ensured.

The installation of an engine start enabling mechanisms in automobiles has become a standard specification in recent years. It has been suggested that the installation of an engine start enabling mechanism can be facilitated by integrating the smart ECU and immobilizer ECU into a single ECU. However, the smart ECU and the immobilizer ECU are provided with numerous connectors for electrical connections with the control units. Therefore, the integrated ECU must be provided with numerous connections, and therefore will ultimately have a larger size. The locations where a large-size integrated ECU can be installed are limited, and it may be difficult to install the integrated ECU in a location from which removal from the vehicle is difficult (for example, a narrow location). When the integrated ECU is installed in a location which allows easy removal from the vehicle, there is concern that the ECU may be removed by a third person.

Furthermore, when the smart ECU and immobilizer ECU are integrated, there are fewer coded communications to start the engine. This lowers the vehicle security level.

The present invention provides a vehicle security device and an identification management device, used by a vehicle security device, that improve vehicle security.

SUMMARY OF THE INVENTION

A first aspect of the present invention is a vehicle security device connected to a vehicle apparatus for communicating with a portable device. The security device includes a first communication means for performing a first coded communication to establish a first mutual authentication with the portable device. An ID code management means is connected to the first communication means, having a first code and a second code, and is incommunicable with the portable device. The ID code management means performs a second coded communication for establishing a second mutual authentication with the first communication means using the first code. A second communication means performs a third coded communication to establish mutual authentication with the ID code management means using the second code. The second communication means enables the operation of the vehicle apparatus when every one of the first, second, and third mutual authentications have been established.

A second aspect of the present invention is a vehicle security device connected to a vehicle apparatus for communicating with a portable device having a portable device code. The security device includes a first electronic control unit, having a vehicle code and a first code, for receiving the portable device code from the portable device. An ID code box, connected to the first electronic control unit and having a first code and a second code, exchanges the first codes with the first electronic control unit. A second electronic control unit, having a second code, exchanges the second codes with the ID code box. The second electronic control unit enables the vehicle apparatus to operate when the portable device code matches the vehicle code, the first code of the first electronic control unit matches the first code of the ID code box, and the second code of the ID code box matches the second code of the second electronic control unit.

A third aspect of the present invention is an ID code management device for use in a vehicle security device connected to a vehicle apparatus. The vehicle security device includes a first communication means for performing a first coded communication to establish a first mutual authentication with the portable device. A second communication means disables operation of the vehicle apparatus when the first mutual authentication is not established. The ID code management device manages a first code and a second code without communicating with the portable device, performs a second coded communication using the first code to establish a second mutual authentication with the first communication means, and performs a third coded communication using the second code to establish a third mutual authentication with the second communication means. The vehicle security device disables the operation of the vehicle apparatus when the third mutual authentication is not established.

DESCRIPTION OF THE PREFERRED EMBODIMENTS

A vehicle security device 11 according to an embodiment of the present invention will now be described in detail with reference to FIG. 2.

Figure 1:
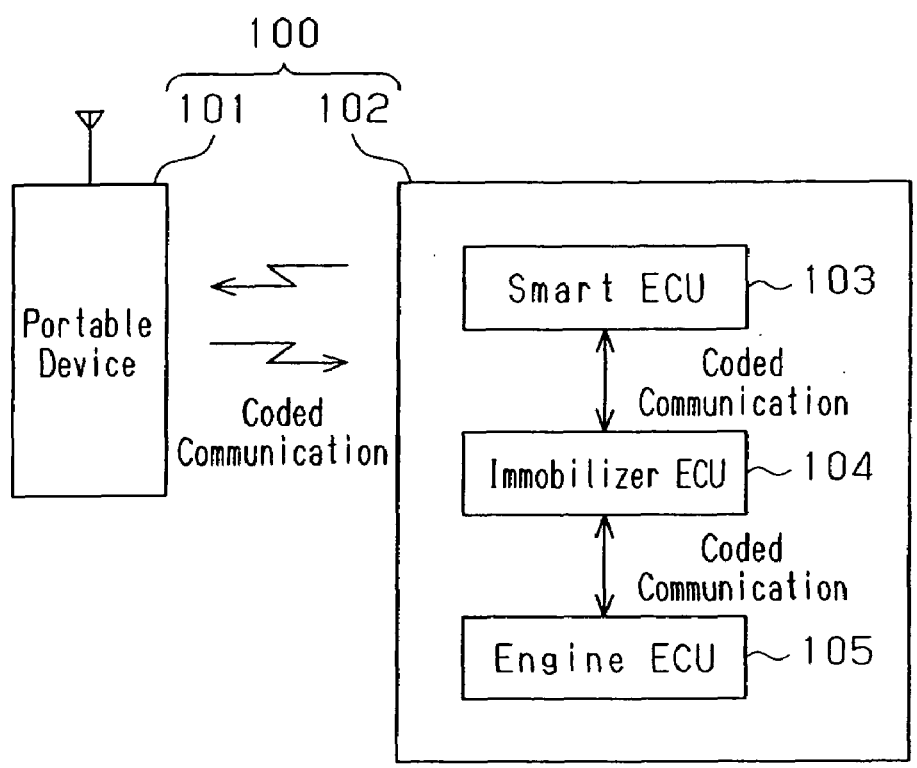
FIG. 1 is a schematic block diagram of a conventional vehicle security device.
Figure 2:
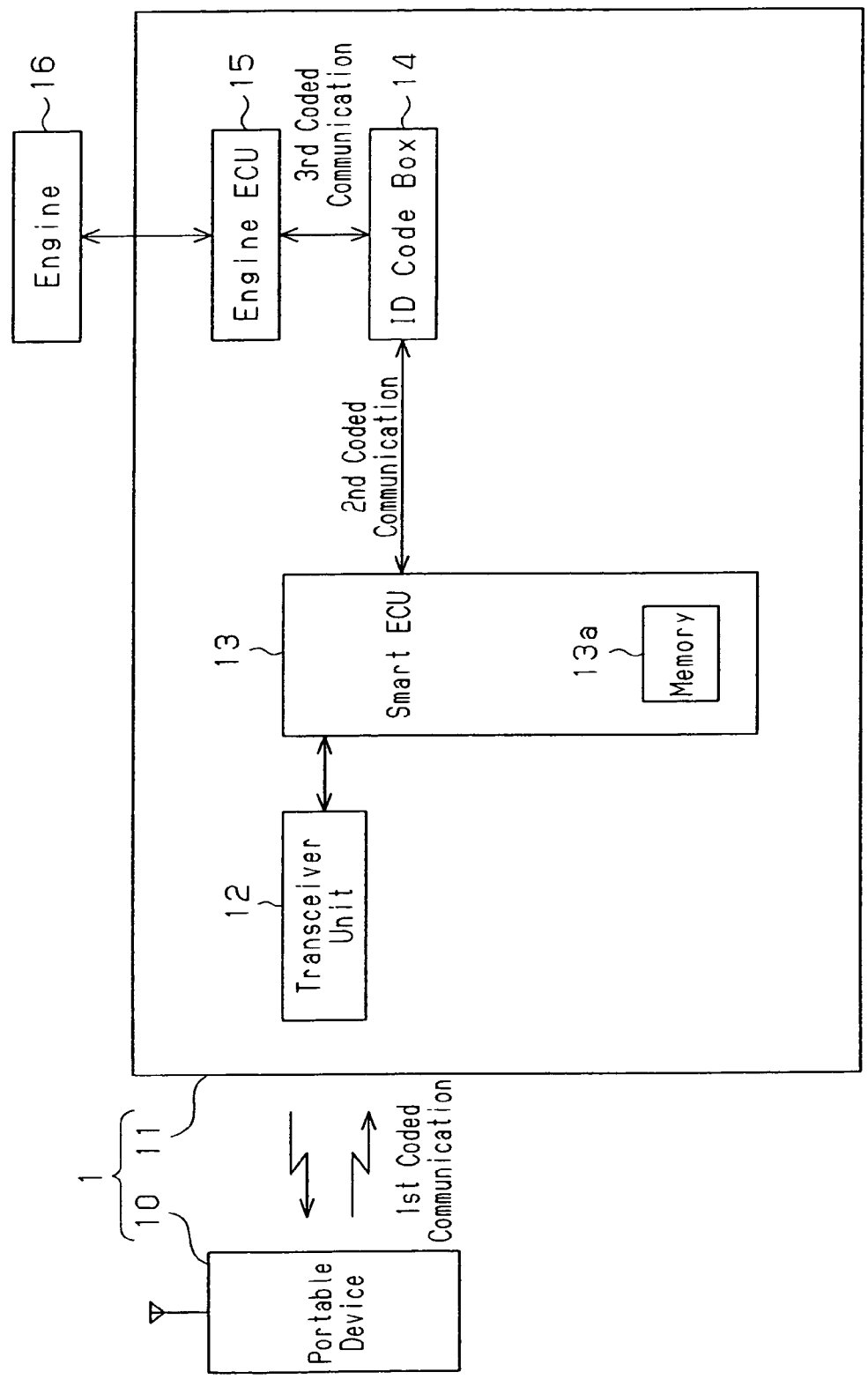
FIG. 2 is a schematic block diagram of a vehicle security device according to an embodiment of the present invention.

As shown in FIG. 2, a vehicle theft prevention system 1 includes a portable device 10, which has a communication function and is carried by a user, and a vehicle security device 11, which is installed in a vehicle. The vehicle security device 11 (specifically, a transceiver unit 12 of the vehicle security device 11) transmits a request signal to the portable device 10.

The portable device 10 has a portable device code unique (differing between portable devices) to the portable device 10. The portable device 10 encodes a code signal included in the portable device code and transmits the encoded code signal in response to the request signal transmitted from the vehicle security device 11.

The vehicle security device 11 is connected to a transceiver unit 12, a smart ECU 13 functioning as a first communications means, ID code box 14 functioning as an ID code management means, and an engine ECU 15 functioning as a second communication means and connected to the ID code box 14. In this structure, at least the ID code box 14 and the engine ECU 15 are installed at locations from which they cannot be easily removed from the vehicle. The transceiver unit 12, the smart ECU 13, the ID code box 14, and the engine ECU 15 are connected by wires.

The smart ECU 13 includes a plurality of connectors connected to a plurality of control units (none shown), such as a body ECU for controlling a steering lock mechanism or lock and unlocking a door. The smart ECU 13 is provided with a smart ECU function and an immobilizer function of the conventional vehicle security device (engine start enabling mechanism). The smart ECU 13 provides a request signal for requesting the transmission of the portable device code to the transceiver unit 12.

The transceiver unit 12 includes an antenna and a vehicle transceiver circuit (not shown). The transceiver unit 12 receives the signal transmitted from the portable device 10, demodulates the reception signal, and provides the demodulated reception signal to the smart ECU 13. When the transceiver unit 12 receives a request signal from the smart ECU 13, the request signal is modulated and a modulated request signal is transmitted via the antenna.

The smart ECU 13, the ID code box 14, and the engine ECU 15 include CPUs (not shown). The smart ECU 13 includes a volatile memory 13a (for example, RAM) and functions as a storage means. The memory 13a stores beforehand a first code used for verification. Further, the smart ECU 13 has a vehicle code unique (differing between vehicle security devices) to the vehicle security device 11.

The smart ECU 13 decodes the reception signal provided from the transceiver unit 12. Then, the smart ECU 13 compares the portable device code of the portable device 10 included in the reception signal with its own vehicle code. In this manner, mutual authentication is performed through communication between the portable device 10 and the smart ECU 13 with coded signals (first coded communication) via the transceiver unit 12. When mutual authentication is established in the first coded communication by the matching of the portable device code and the vehicle code, the smart ECU 13 determines that the portable device 10 is authentic.

The ID code box 14 does not communicate with the portable device 10. In the present embodiment, the ID code box 14 includes a communication circuit, a CPU, and a nonvolatile memory (none shown). The ID code box 14 does not include circuits for controlling vehicle apparatuses (e.g., doors, an engine 16, and car audio device).

The memory of the ID code box 14 stores one or more codes used to perform mutual authentication with other devices. In the present embodiment, the memory of the ID code box 14 stores a first code and a second code. Alternatively, the memory of the ID code box 14 may also store a vehicle code in addition to the first code and second code.

A second coded communication is performed between the smart ECU 13 and the ID code box 14 to compare a first code of the smart ECU 13 and the first code of the ID code box 14 and perform mutual authentication. The mutual authentication may be conducted by either the smart ECU 13 or the ID code box 14.

The engine ECU 15 stores a second code. A third coded communication is performed between the engine ECU 15 and the ID code box 14 to compare the second code of the ID code box 14 and the second code of the engine ECU 15 and perform mutual authentication. The mutual authentication may be conducted by either the engine ECU 15 or the ID code box 14.

In the second coded communication between the smart ECU 13 and the ID code box 14, the communication circuit of the ID code box 14 transmits or receives the first code used in mutual authentication of the smart ECU 13 based on instructions of the CPU. Furthermore, in the third coded communication between the engine ECU 15 and the ID code box 14, the communication circuit transmits or receives the second code used for mutual authentication of the engine ECU 15 based on instructions of the CPU.

The engine ECU 15 is connected to the engine 16 (vehicle apparatus) to control the engine 16. The engine ECU 15 enables the engine 16 to start when mutual authentication has been established in every one of the first coded communication, the second coded communication, and the third coded communication. That is, the engine ECU 15 verifies whether or not mutual authentication has been established between the portable device 10 and the smart ECU 13, mutual authentication has been established between the smart ECU 13 and the ID code box 14, and mutual authentication has been established between the ID code box 14 and the engine ECU 15 to enable the engine 16 to start when all mutual authentications have been established. When the portable device 10, the smart ECU 13, the ID code box 14, and the engine ECU 15 have all been determined as being authentic through the mutual authentications, the engine ECU 15 enables the engine 16 to start.

The memory 13a of the smart ECU 13 is volatile. Accordingly, the first code stored in the memory 13a is erased when the supply of power to the smart ECU 13 is instantaneously cut. Thereafter, when power is supplied, the smart ECU 13 generates the first code through a calculation formula unique to the smart ECU 13 (differing between smart ECUs) with the vehicle code (third code), which is used in the first coded communication. Therefore, the second coded communication is performed and the user may start the engine 16 to drive the vehicle even during an unexpected circumstance such as instantaneous interruption of battery power.

When the smart ECU 13 is removed from the vehicle, power is not supplied to the smart ECU 13. In this case, the first code is erased from the memory 13*a* in the same manner as when an instantaneous battery power interruption occurs. Therefore, the first code cannot be obtained by analyzing the removed smart ECU 13. Thus, it is impossible to obtain the first code through an unauthorized means.

As described above, when the power supply is cut and then the power is restored, the smart ECU 13 generates the first code using the calculation formula. The calculation formula used at this time differs for each smart ECU. Accordingly, when the smart ECU 13 is exchanged, the first code generated by the exchanged smart ECU 13 differs from the first code generated by the original smart ECU 13. Thus, the second coded communication cannot be established. Consequently, the engine ECU 15 disables the starting of the engine 16. That is, when a third person exchanges the smart ECU in an unauthorized manner, the third person cannot drive the vehicle.

As described above, the ID code box 14 is provided with a nonvolatile memory. Therefore, the first code and second code stored in the memory of the ID code box 14 cannot be erased and is saved even when power is not supplied to the ID code box 14 due to, for example, an instantaneous battery power interruption.

The vehicle security device 11 of the present embodiment has the advantages described below.

(1) The second coded communication is performed between the smart ECU 13 and the ID code box 14, and mutual authentication is accomplished using the first codes of the smart ECU 13 and the ID code box 14. Therefore, when the authentic smart ECU 13 is exchanged by another smart ECU, mutual authentication cannot be established because the first code of the exchanged smart ECU differs from the first code of the ID code box 14. When the smart ECU 13 and the ID code box 14 do not establish mutual authentication, the engine ECU 15 disables the starting of the engine 16 even if, for example, mutual authentication is established by the ID code box 14 through the third coded communication. Furthermore, since the ID code box 14 does not communicate with the portable device 10, it does not require a communication function and is relatively small in size. Therefore, the ID code box 14 is free from location and wiring restrictions and may easily be installed in a location where it is difficult to remove from the vehicle. Accordingly, the vehicle security level is improved by installing the ID code box 14 in a location where it is difficult to remove from the vehicle.

(2) The smart ECU 13 includes a volatile memory 13*a* for storing a first code used in the second coded communication. Therefore, when the smart ECU 13 is removed from the vehicle, the first code is erased from the memory 13*a*. Consequently, a third person cannot obtain the first code by removing the smart ECU 13 from the vehicle and analyzing it. That is, the vehicle security device 11 prevents the first code from being obtained in an unauthorized manner, such as when the smart ECU 13 is removed from the vehicle and the contents of the memory 13*a* are analyzed. Accordingly, the vehicle security device 11 prevents the establishment of mutual authentication between the smart ECU 13 and the ID code box 14 through an unauthorized means and significantly improves the vehicle security level. A third person cannot start the engine 16 even when removing the smart ECU 13 from the vehicle and analyzing it. Moreover, the smart ECU 13 can be installed at a location where it may easily be removed from the vehicle. This allows a relatively greater freedom in the installation of the smart ECU 13.

(3) The smart ECU 13 generates a first code using a calculation formula, which is unique to that particular smart ECU 13, and a vehicle code used in the first coded communication. Thus, even if a third person removes the smart ECU 13 from the vehicle and analyzes it, it is impossible to establish mutual authentication through the second coded communication unless the calculation formula for generating the first code is obtained. In general, it is very difficult to remove the smart ECU 13 from the vehicle and analyze the calculation formula for generating the first code. Therefore, the vehicle security device 11 significantly improves the security level of the vehicle.

The calculation formula used to generate the first code and stored in the smart ECU 13 differs from the calculation formulas used in other smart ECUs. Thus, the first code generated by another ECU differs from the first code generated by the smart ECU 13. Therefore, when the existing smart ECU 13 is replaced by another smart ECU, the second coded communication cannot be established. That is, if a third person who has no way to know the first code replaces the smart ECU 13, the second coded communication cannot be established and the engine ECU 15 disables the starting of the engine 16. Accordingly, the vehicle security device 11 significantly improves the security level of the vehicle.

(4) When the first code is erased from the memory 13*a* due to an instantaneous battery power interruption, the smart ECU 13 generates a first code by performing a calculation with the vehicle code it contains. Therefore, the second coded communication may be performed and the user can start the engine 16 to drive the vehicle even when under an unexpected circumstance, such as an instantaneous battery power interruption. Even when the first code is erased from the memory 13*a* of the smart ECU 13 due to instantaneous battery power interruption, a complex operation to restore the first code to the memory 13*a* is unnecessary. This improves the convenience of the vehicle security device 11.

(5) The smart ECU 13 may be installed separately from the ID code box 14 and engine ECU 15 at a location which enables relatively easy removal from the vehicle, for example, below the driver seat. Installation of the smart ECU 13 at such a location allowing easy removal also facilitates maintenance. This improves the convenience of the vehicle security device 11.

(6) The engine ECU 15 enables the engine 16 to start when mutual authentication has been established in all coded communications including the first coded communication, the second coded communication, and the third coded communication. That is, three mutual authentications must be established to enable the starting of the engine 16. When the function of an immobilizer ECU and the function of a smart ECU in a conventional vehicle security device are integrated, coded communication between the smart ECU and the immobilizer ECU is unnecessary. That is, coded communications are performed only twice to enable the starting of the engine 16. In the present embodiment, three coded communications are performed since a second coded communication is performed between the smart ECU and the ID code box 14. Therefore, the vehicle security device 11 of the present embodiment improves the security level of the vehicle.

The embodiment of the present invention may be modified as described below.

Figure 3:
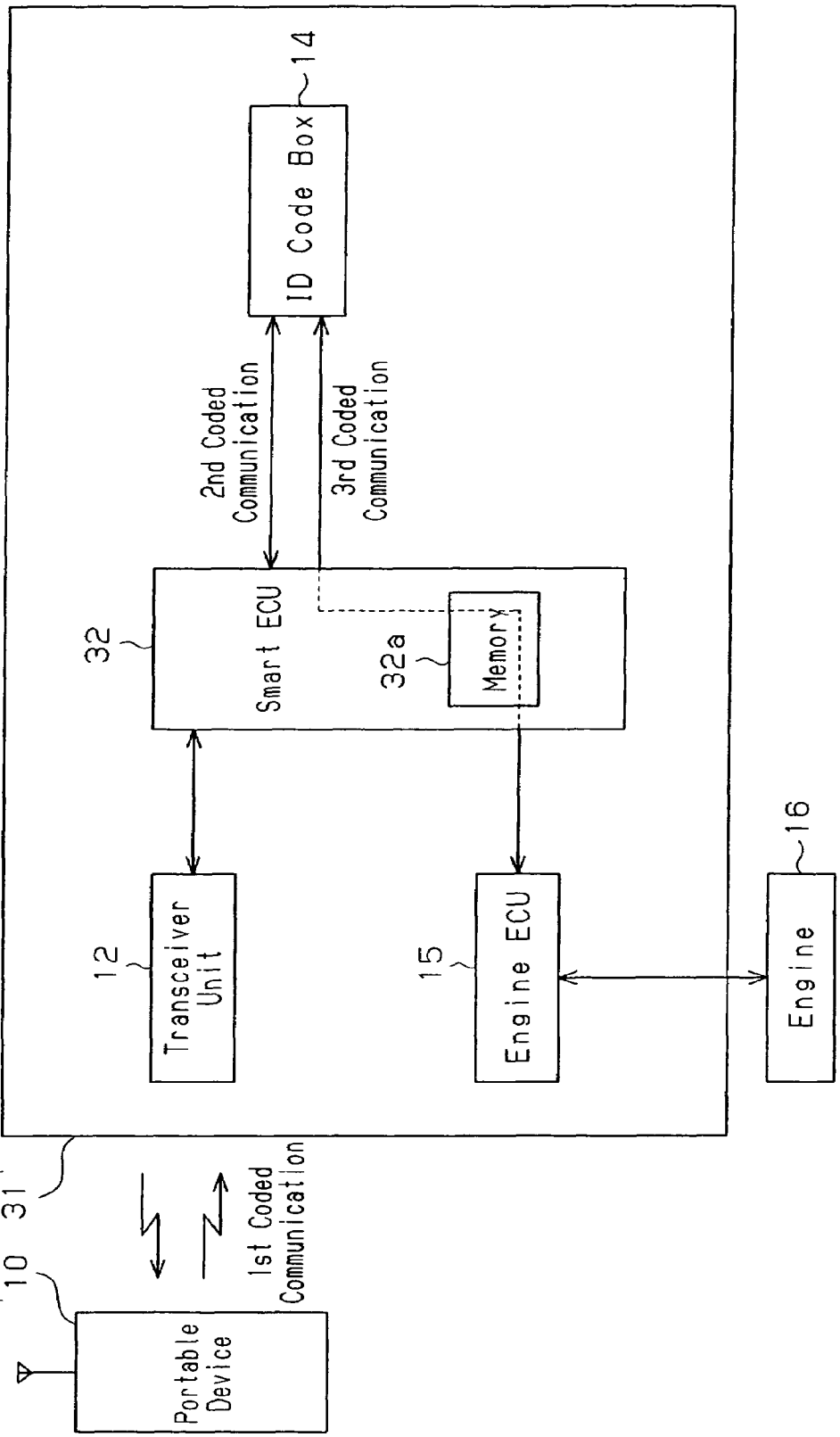
FIG. 3 is a schematic block diagram of a vehicle security device according to another embodiment of the present invention.

In the present embodiment, the smart ECU 13 and the engine ECU 15 are connected to the ID code box 14. However, the connection layout of each element in the vehicle security device 11 is not limited to the connection layout shown in FIG. 2. For example, in a vehicle security device 31 of a vehicle theft prevention system 30, the engine ECU 15 may be connected to a smart ECU 32 as shown in FIG. 3. In this case, the smart ECU 32 is provided with a function for performing mutual authentication through a first coded communication and mutual authentication through a second coded communication. The smart ECU 32 also mediates mutual authentication through a third coded communication between the engine ECU 15 and the ID code box 14.

Specifically, the smart ECU 32 is provided with a volatile memory 32a, which functions as a storage means. The smart ECU 32 provides a reception signal from the engine ECU 15 to the ID code box 14 via the memory 32a. Furthermore, the smart ECU 32 provides a signal received from the ID code box 14 to the engine ECU 15 via the memory 32a. In this manner, the smart ECU 32 mediates mutual authentication for the third coded communication. That is, the smart ECU 32 uses the memory 32a as a buffer to mediate mutual authentication through the third coded communication.

In this structure, the contents of the memory 32a are erased when the smart ECU 32 is removed from the vehicle. Therefore, a third person cannot obtain the second code even when analyzing the smart ECU 32. Thus, the second code is prevented from being obtained in an unauthorized manner. Accordingly, the vehicle security device 31 prevents unauthorized establishment of the mutual authentication between the ID code box 14 and the engine ECU 15 and maintains the security level of the vehicle. Moreover, there are more options for the connection layout of the structural elements in the vehicle security device while the vehicle security level is maintained.

Since the ID code box 14 is only connected to the smart ECU 32, the ID code box 14 has fewer connectors. The ID code box 14 therefore has a relatively simple structure. Accordingly, the ID code box 14 can be made more compact. This facilitates installation of the ID code box 14 at a location from which it is difficult to remove from the vehicle.

The smart ECU 13 of the present embodiment generates a first code by performing a calculation with the vehicle code in order to establish the second coded communication and stores the generated first code in the volatile memory 13a. However, the smart ECU 13 does need not to store the generated first code in the memory 13a. In such a case, the smart ECU 13 generates a first code by performing a calculation each time the second coded communication is performed.

In the embodiment, the third coded communication is performed between the ID code box 14 and the engine ECU 15. However, the ECU that performs the third coded communication with the ID code box 14 is not limited to the engine ECU 15. For example, the vehicle security device may include a steering lock ECU connected to the ID code box 14, and the third coded communication may be performed between the ID code box 14 and the steering lock ECU. The steering lock ECU unlocks the steering wheel when mutual authentication is established in all coded communications, including the first coded communication, the second coded communication, and the third coded communication. Such a vehicle security device improves the security level of the vehicle by preventing unauthorized unlocking of the steering wheel. That is, a second communication means connected to the ID code box 14 may be any ECU having the capability to restrict driving of the vehicle.

In the embodiment, the functions of the smart ECU and the functions of the immobilizer ECU are integrated in the smart ECU 13. However, the smart ECU and the immobilizer ECU may be provided separately as in a conventional vehicle security device. In this case, the second coded communication is performed between the ID code box 14 and the smart ECU 32 and between the ID code box 14 and the immobilizer ECU. This increases the number of coded communications necessary to enable the starting of the engine 16 in comparison to the conventional device. Therefore, the security level of the vehicle is improved.

The second communication means is not limited to the engine ECU 15. For example, the second communication means may also be a door ECU for controlling the raising and lowering of the window glass. In this case, the door ECU enables the raising and lowering of the window glass when mutual authentications have been established in all mutual authentications including the first coded communication, the second coded communication, and the third coded communication. The second communication means may also be a CPU (ECU) for controlling the operation of a car audio device. In such cases, the CPU enables the operation of the power window or the operation of the car audio device when mutual authentication is established for all mutual authentications including the first through third coded communications. This prevents unauthorized use of these vehicle apparatuses by a third person.

Furthermore, the second communication means may also be a shift-lock CPU (ECU) for controlling the locking of the shift lever in a non-driving position (parking position or neutral position) or a tire-lock CPU (ECU) for controlling the locking of the tires. In such a case, the shift-lock CPU releases the lock on the shift level and enables the vehicle to be driven when mutual authentication has been established in all of the coded communications including the first through third coded communications. The tire-lock CPU releases the lock on the tires and enables the vehicle to be driven when mutual authentication has been established in all of the coded communications including the first through third coded communications. In this case, when mutual authentications are not established in every one of the first through third coded communications, the driving of the vehicle is disabled. Accordingly, vehicle theft is prevented, and the vehicle security level is further improved.

The invention claimed is:

1. A vehicle security device connected to a vehicle apparatus for communicating with a portable device, the security device comprising:
    a first communication means for performing a first coded communication to establish a first mutual authentication with the portable device;
    an ID code management means connected to the first communication means, having a first code and a second code, and being incommunicable with the portable device, the ID code management means performing a second coded communication for establishing a second mutual authentication with the first communication means using the first code; and
    a second communication means for performing a third coded communication to establish mutual authentication with the ID code management means using the second code, the second communication means enabling the operation of the vehicle apparatus when every one of the first, second, and third mutual authentications have been established.

2. The vehicle security device according to claim 1, wherein the second communication means enables the vehicle to be driven when all of the first, second, and third mutual authentications are established.

3. The vehicle security device according to claim 2, wherein the first communication means includes a volatile storage means for storing the first code.

4. The vehicle security device according to claim 2, wherein the second communication means includes a nonvolatile storage means for storing the first code and the second code.

5. The vehicle security device according to claim 2, wherein the first communication means generates a first code using a calculation formula, unique to the first communication device, and a third code.

6. The vehicle security device according to claim 2, wherein:
the vehicle apparatus includes an engine; and
the second communication means enables the engine to be started when all of the first, second, and third mutual authentications have been established.

7. The vehicle security device according to claim 2, wherein:
the first communication means includes a volatile storage means for storing a signal; and
the second communication means and the ID code management means sends and receives the signal via the storage means.

8. The vehicle security device according to claim 2, wherein the first communication means includes an electronic control unit used for smart ignition.

9. The vehicle security device according to claim 2, wherein the second communication means includes an electronic control unit used for engine control.

10. The vehicle security device according to claim 1, wherein the first communication means includes a volatile storage means for storing the first code.

11. The vehicle security device according to claim 10, wherein the second communication means includes a nonvolatile storage means for storing the first code and the second code.

12. The vehicle security device according to claim 10, wherein the first communication means generates a first code using a calculation formula, unique to the first communication device, and a third code.

13. The vehicle security device according to claim 1, wherein the second communication means includes a nonvolatile storage means for storing the first code and the second code.

14. The vehicle security device according to claim 1, wherein the first communication means generates a first code using a calculation formula, unique to the first communication device, and a third code.

15. The vehicle security device according to claim 1, wherein:
the vehicle apparatus includes an engine; and
the second communication means enables the engine to be started when all of the first, second, and third mutual authentications have been established.

16. The vehicle security device according to claim 1, wherein:
the first communication means includes a volatile storage means for storing a signal; and
the second communication means and the ID code management means sends and receives the signal via the storage means.

17. The vehicle security device according to claim 1, wherein the first communication means includes an electronic control unit used for smart ignition.

18. The vehicle security device according to claim 1, wherein the second communication means includes an electronic control unit used for engine control.

19. A vehicle security device connected to a vehicle apparatus for communicating with a portable device having a portable device code, the security device comprising:
a first electronic control unit, having a vehicle code and a first code, for receiving the portable device code from the portable device;
an ID code box, connected to the first electronic control unit and having a first code and a second code, for exchanging the first codes with the first electronic control unit; and
a second electronic control unit, having a second code, for exchanging the second codes with the ID code box, the second electronic control unit enabling the vehicle apparatus to operate when the portable device code matches the vehicle code, the first code of the first electronic control unit matches the first code of the ID code box, and the second code of the ID code box matches the second code of the second electronic control unit.

20. An ID code management device for use in a vehicle security device connected to a vehicle apparatus, the vehicle security device comprising:
a first communication means for performing a first coded communication to establish a first mutual authentication with a portable device, and a second communication means for disabling operation of the vehicle apparatus when the first mutual authentication is not established;
the ID code management device managing a first code and a second code without communicating with the portable device, performing a second coded communication using the first code to establish a second mutual authentication with the first communication means, and performing a third coded communication using the second code to establish a third mutual authentication with the second communication means; and
the vehicle security device disables the operation of the vehicle apparatus when the third mutual authentication is not established.

* * * * *